(12) United States Patent
Nicolae

(10) Patent No.: US 9,442,669 B2
(45) Date of Patent: Sep. 13, 2016

(54) COST-EFFECTIVE IAAS (INFRASTRUCTURE-AS-A-SERVICE) CLOUD STORAGE BASED ON ADAPTIVE VIRTUAL DISKS (AVD)

(71) Applicant: INTERNATIONAL BUSINESS MACHINES CORPORATION, Armonk, NY (US)

(72) Inventor: Bogdan Nicolae, Dublin (IE)

(73) Assignee: International Business Machines Corporation, Armonk, NY (US)

(*) Notice: Subject to any disclaimer, the term of this patent is extended or adjusted under 35 U.S.C. 154(b) by 44 days.

(21) Appl. No.: 14/452,732

(22) Filed: Aug. 6, 2014

(65) Prior Publication Data

US 2016/0041787 A1 Feb. 11, 2016

(51) Int. Cl.
*G06F 13/12* (2006.01)
*G06F 3/06* (2006.01)

(52) U.S. Cl.
CPC ........... *G06F 3/0631* (2013.01); *G06F 3/067* (2013.01); *G06F 3/0608* (2013.01); *G06F 3/0613* (2013.01)

(58) Field of Classification Search
CPC .. G06F 3/0631; G06F 3/0608; G06F 3/0613; G06F 3/067
See application file for complete search history.

(56) References Cited

U.S. PATENT DOCUMENTS

| 8,321,645 | B2 | 11/2012 | Rabii et al. | |
|---|---|---|---|---|
| 8,359,223 | B2 | 1/2013 | Chi et al. | |
| 2011/0131335 | A1* | 6/2011 | Spaltro | G06F 9/5072 709/228 |
| 2012/0173871 | A1* | 7/2012 | Ashok | G06F 21/575 713/153 |
| 2012/0179446 | A1* | 7/2012 | Tylutki | G06F 11/3442 703/21 |
| 2013/0060933 | A1* | 3/2013 | Tung | G06F 11/3495 709/224 |
| 2013/0081014 | A1* | 3/2013 | Kadatch | G06F 9/5027 718/1 |
| 2013/0132698 | A1 | 5/2013 | Huang | |
| 2013/0219069 | A1* | 8/2013 | Yellapragada | G06F 3/0605 709/226 |
| 2013/0304903 | A1* | 11/2013 | Mick | H04L 43/0817 709/224 |

(Continued)

FOREIGN PATENT DOCUMENTS

| CN | 101938416 A | * | 1/2011 |
|---|---|---|---|
| CN | 102520887 A | * | 6/2012 |

(Continued)

OTHER PUBLICATIONS

"SLA-aware virtual resource management for cloud infrastructures" by Hien Nguyen Van, Frederic Dang Tran and Jean-Marc Menaud, "9th IEEE International Conference on Computer and Information Technology (CIT'09), Xiamen : China (2009)".*

(Continued)

*Primary Examiner* — Jing-Yih Shyu
(74) *Attorney, Agent, or Firm* — Scully, Scott, Murphy & Presser, P.C.; Kurt P. Goudy, Esq.

(57) ABSTRACT

There are provided a system, a method and a computer program product for operating a cloud computing storage system. The cloud computing storage system allocates and manages virtual disks. A virtual disk provides a logical data storage. The cloud computing storage system divides data stored in the virtual disks into chunks and allocates the chunks to physical data storage devices. The cloud computing storage system monitors I/O access patterns and user requests to change data storage capacities and throughputs of the virtual disks in real time. The cloud computing storage system dynamically reconfigures an allocation of the chunks to the physical data storage devices.

17 Claims, 6 Drawing Sheets

(56) References Cited

U.S. PATENT DOCUMENTS

| | | | | |
|---|---|---|---|---|
| 2013/0311778 | A1* | 11/2013 | Cherukuri | H04L 63/0272 713/171 |
| 2014/0258446 | A1* | 9/2014 | Bursell | G06F 15/177 709/217 |
| 2014/0297733 | A1* | 10/2014 | Wang | H04L 67/10 709/203 |
| 2015/0324182 | A1* | 11/2015 | Barros | G06F 8/61 717/174 |

FOREIGN PATENT DOCUMENTS

| | | |
|---|---|---|
| CN | 103365700 | 10/2013 |
| CN | 103605613 | 2/2014 |

OTHER PUBLICATIONS

Capacity Management and Planning Strategies in the Cloud Era, Posted on Sep. 21, 2012 (https://blogs.vmware.com/management/2012/09/capacity-management-planning-private-cloud.html) by Sudhir Bhatti.*

"Capacity Planning in a Dynamic Virtual Environment", Jul. 14, 2014 by Anson McCook.*

"Dynamic Capacity Management in Virtual Environments" White Paper by Andrew Hillier at CiRBA Inc., 2008.*

"Managing change in dynamic virtual environments" by David Davis, Aug. 2008.*

Ling et al., "Efficient Disk I/O Scheduling with QoS Guarantee for Xen-based Hosting Platforms", In Proceedings of the 2012 12th IEEE/ACM International Symposium on Cluster, Cloud and Grid Computing (ccgrid 2012) (CCGRID'12), IEEE Computer Society, Washington, DC, USA, 978-0-7695-4691-9; Sep. 2012; pp. 81-89.

Seelam et al., "Virtual I/O Scheduler: A Scheduler of Schedulers for Performance Virtualization", In Proceedings of the 3rd International conference on Virtual execution environments (VEE'01). Jun. 13-15, 2007, San Diego, California, USA; ACM, New York, NY, USA, pp. 105-115.

Nicolae et al., "Going Back and Forth: Efficient Multideployment and Mutlishapshotting on Clouds", In Proceedings of the 20th international symposium on High performance distributed computing (HPSC'11), Jun. 8-11, 2011, San Jose, California, USA; ACM, New York, NY, USA, pp. 147-158.

Alvarez et al., "Minerva: An Automated Resource Provisioning Tool for Large-Scale Storage Systems", ACM Transactions on Computer Systems, vol. 19, No. 4 (Nov. 2001), pp. 483-518.

Amazon Web Service, Inc., "Amazon EC2", http://aws.amazon.com/ec2/, lasted printed date: Apr. 25, 2014.

* cited by examiner

COST-EFFECTIVE IAAS (INFRASTRUCTURE-AS-A-SERVICE) CLOUD STORAGE BASED ON ADAPTIVE VIRTUAL DISKS (AVD)

BACKGROUND

This disclosure relates to operating a cloud computing service system and particularly to managing virtual disks in a cloud computing service environment.

BACKGROUND OF THE INVENTION

In a cloud computing environment, a user does not need an infrastructure in order to use a computing resource(s), e.g., a data storage device(s), a computing system(s), etc. but rather relies on virtual resources. A virtual machine behaves like a physical machine, simulating a behavior of the physical machine and hiding how the physical machine is leveraged in order to do so. Similarly, a virtual disk behaves like a physical data storage device and can be freely attached and detached from a virtual machine in a manner similar to how a physical storage device is attached to physical machine. In a cloud computing environment, a user pays for how long the user has used the virtual disk. A virtual disk throughput or bandwidth refers to the number of bytes per second that a user can read or write from or to the virtual disk. A virtual disk size or capacity refers to the total number of bytes that are allocated to the user and accessible both for reading and writing.

SUMMARY

There are provided a system, a method and a computer program product for operating a cloud computing storage system. The cloud computing storage system allocates and manages virtual disks. A virtual disk provides a logical data storage. The cloud computing storage system divides data stored in the virtual disks into chunks and allocates the chunks to physical data storage devices. The cloud computing storage system monitors I/O access patterns and user requests to change data storage capacities and throughputs of the virtual disks in real time. The cloud computing storage system dynamically reconfigures an allocation of the chunks to the physical data storage devices.

The cloud computing storage system charges, by using a cost model, one or more users based on data storage capacities and throughput requirements of block devices provisioned as the virtual disks. The cost model determines a cost to use the cloud computing storage system for a user based on: the data storage capacities of the virtual disks that are provided to or to be provided to the users; the throughputs of the virtual disks that are provided to or to be provided to the users; and an adjustment factor that converts the data storage capacities and the throughputs of the virtual disks, which are provided to or to be provided to the users, to a monetary value.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 5:
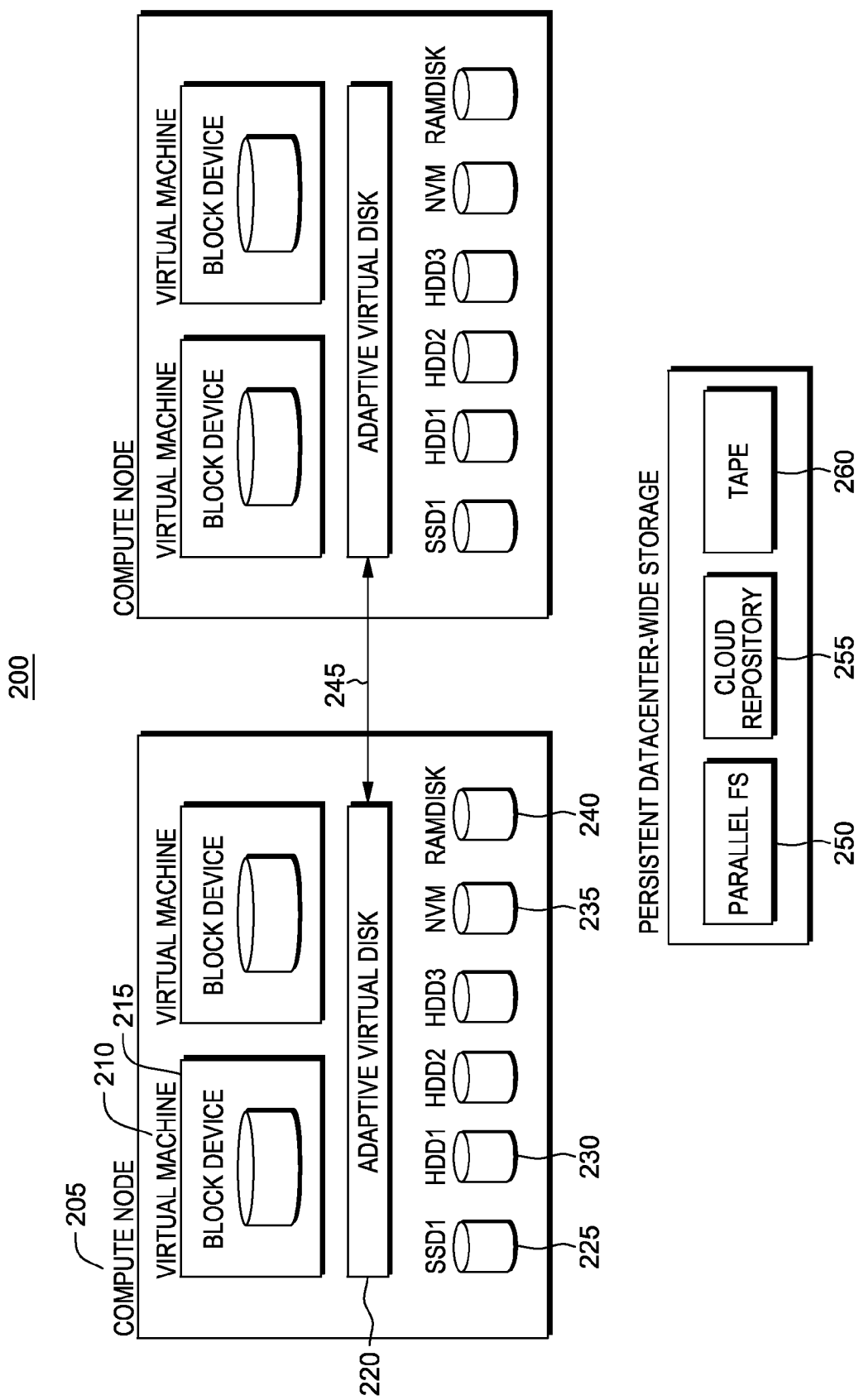
FIG. 5 illustrates an example cloud computing service system in one embodiment.

FIG. 5 illustrates an example cloud computing storage system 200. The cloud computing storage system 200 includes, but is not limited to: one or more computing node(s) 205 each of which runs one or more virtual machine(s) 210, one or more block device(s) 215 provisioned as one or more adaptive virtual disk(s) 220, the one or adaptive virtual disk(s) 220, which leverages one or more local physical data storage device(s) 225-240, as well as one or more remote data storage service(s) 250-260. A block device includes, but is not limited to: a solid state drive, a hard disk drive, an optical disc drive, a flash memory device, a RAM disk, etc. The cloud computing storage system 200 charges, by using a data storage cost model, users based on data storage capacities and throughput requirements of block devices 215 associated with the virtual machine 210 and provisioned as adaptive virtual disks 220.

In one embodiment, a use of an adaptive virtual disk is characterized according to at least three aspects as follows:

1. Live virtual disk elasticity: the ability to enable the users to modify data storage capacity and throughput capability of the block device(s) 215 in real time (i.e., while the block device(s) 215 is still attached to the virtual machine 210 and under active use) using an API 325 (Application Programming Interface) shown in FIG. 6 (API 325 is used by the users to control their desired data storage capacities and disk bandwidths for their adaptive virtual disks);
2. The data storage cost model that charges the users based on choices that those users make while leveraging the virtual disks using the API mentioned above; and
3. A computing node architecture and associated set of techniques to manage a physical storage infrastructure such that a multitude of virtual disks that support the live elasticity can be exposed to multiple users simultaneously.

By using those aspects of the adaptive virtual disks, the users may achieve satisfaction of I/O performance of their applications without over-paying for unused resources in the cloud computing storage system. At the same time, by exposing adaptive virtual disks to their users, the cloud provider can support more users at the same time and/or use less physical resources to satisfy QoS constraints, which increases profit and, respectively, reduces operational costs.

The cost model determines a cost to use the cloud storage system for one or more users based on, but not limited to: (1) data storage capacities of the adaptive virtual disks that are provided to or to be provided to the one or more users; (2) throughputs of the adaptive virtual disks that are provided to or to be provided to the one or more users; and (3) an adjustment factor that converts the data storage capacities and the throughputs of the adaptive virtual disks, which are provided to or to be provided to the users, to a monetary value. An example cost model includes, but is not limited to:

$$C(t) = K \int_0^t S(x)B(x)dx,$$

where C(t) is the cost incurred for using the adaptive virtual disks from when it was attached to VM (Virtual Machine) instance (moment 0) up to a particular moment in time t; S(x) is the data storage capacity of the virtual disks at moment 0<=x<t and corresponds to the latest size modification that may have occurred using the API at an earlier moment 0<=t'<x; B(x) is a bandwidth of the virtual disk at moment x and corresponds to a latest choice of a virtual disk bandwidth made by a corresponding user using the API; and K is an adjustment factor that converts data storage capacity and bandwidth utilization to real monetary values. This adjustment factor can be negotiated between the cloud computing storage system provider and a corresponding user based on various criteria (e.g., discount for virtual disks whose number is more than a pre-determined threshold, differentiating of nighttime costs and daytime costs, etc.)

Figure 4:
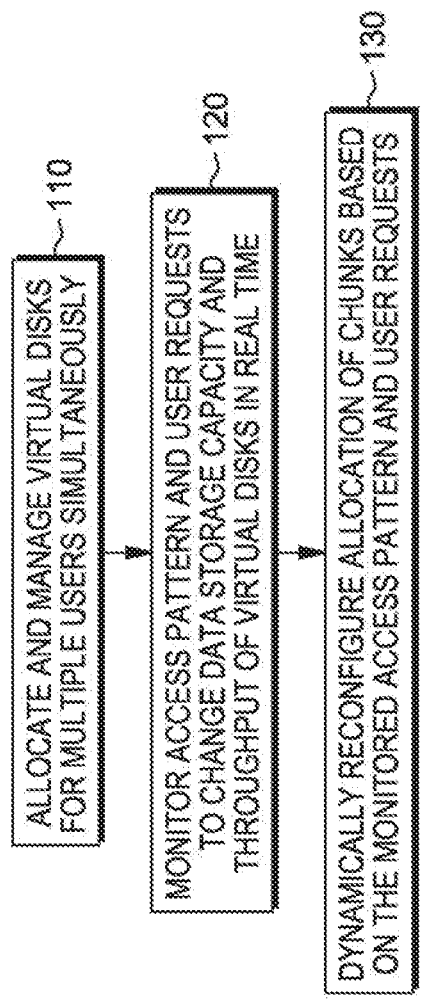
FIG. 4 illustrates a flowchart that describes a method for operating a cloud computing storage system in one embodiment.

Returning to FIG. 6, the cloud computing storage system 200 enables the users, through the API 325, to modify the data storage capacities and throughput requirements of the adaptive virtual disks 220 dynamically in an online fashion while the virtual disks are attached to running virtual machine instances 210 and in active use. FIG. 4 illustrates a flowchart for operating the cloud computing storage system. At 110, the adaptive virtual disk middleware 340 allocates and manages the adaptive virtual disks 220 for the users simultaneously based on I/O requirements specified by the users. A virtual disk may include, but is not limited to a block device abstraction accessible from the VM instance.

At 110, the cloud computing storage system divides data stored in the virtual disks into chunks and allocates the chunks to physical data storage devices (e.g., block devices 215 shown in FIG. 5). At 120, the cloud computing storage system monitors I/O access patterns and user requests to change data storage capacities and throughputs of the virtual disks in real time. At 130, the cloud computing storage system dynamically reconfigures an allocation of the chunks to the physical data storage devices. By reconfiguring the allocation of the chunks, the cloud computing storage system 200 optimizes the utilization of physical storage devices associated with the adaptive virtual disks by minimizing operational costs and maximizing a number of users supported simultaneously without violating quality-of-service constraints. The physical storage devices include, but are not limited to: the block device 215, a solid state storage device 225, a hard disk drive 230, a non-volatile data storage device 235-240, a file system 250 accessible in parallel, a data repository 255, a tape drive 260, etc.

In one embodiment, in order to optimize the physical storage devices, the cloud computing storage system splits the adaptive virtual disks into chunks and distributes the chunks across a set of physical storage devices. A chunk is a contiguous sequence of bytes of predefined size that holds data written to the virtual disk at a specified offset. No two chunks can overlap. The union of all chunks results in the full content of the virtual disk. The adaptive virtual disk middleware 340 shown in FIG. 6 migrates the chunks between various local physical storage devices of various capacities and throughput capabilities, as well as other remote adaptive virtual disk middleware via a communication link 245 shown in FIG. 5, in order to dynamically adapt to the modification of I/O performance and capacity requirements as specified by the users.

In another embodiment, in order to optimize the physical storage devices, the adaptive virtual disk middleware 340 consolidates the chunks on physical storage devices providing the least throughput and capacity in order to support as many users as possible and reduces operational costs without violating the I/O performance and capacity requirements.

Figure 6:
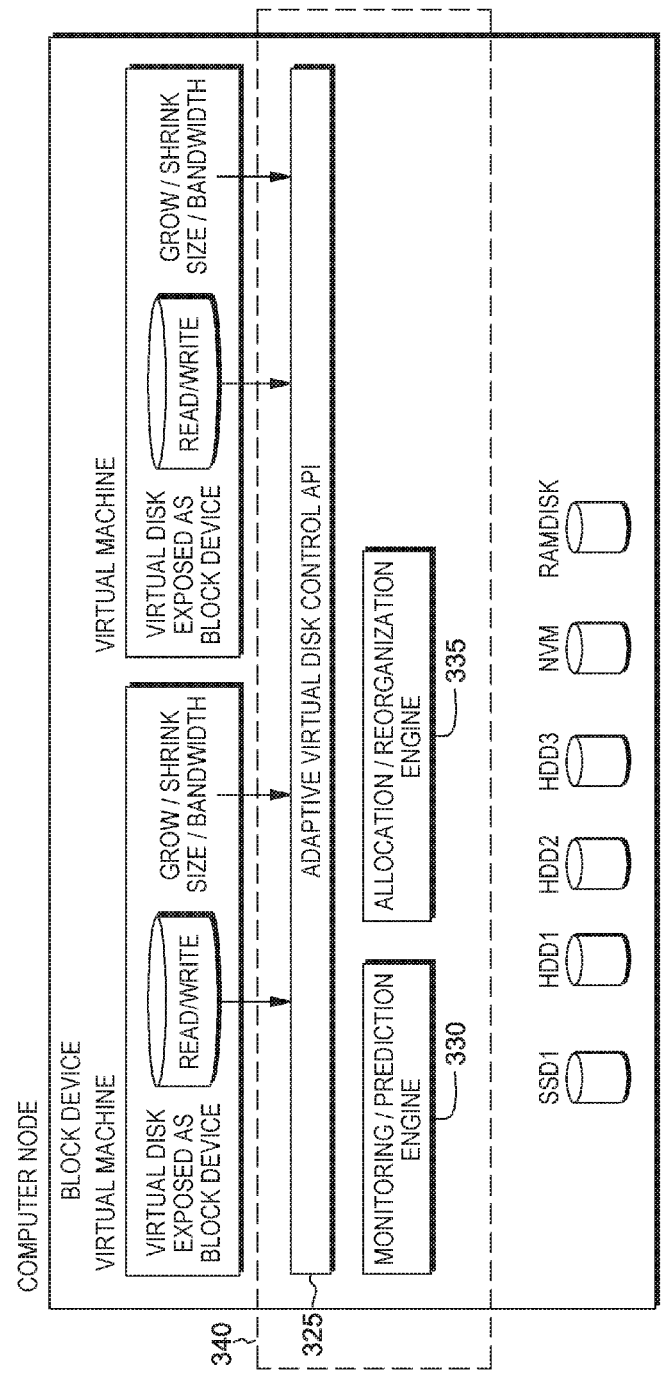
FIG. 6 illustrates another example cloud computing service system in one embodiment.

In one embodiment, in order to allocate and manage the adaptive virtual disks at 110 shown in FIG. 4, the adaptive virtual disk middleware 340 utilizes an allocation/reorganization engine 335 shown in FIG. 6. The allocation/reorganization engine 335 is responsible to manage the physical storage devices that are locally available on a corresponding physical computing node 205 where one or more VM 210 is running. The user grows or shrinks the capacity of adaptive virtual disks using the API 325. Growing or shrinking of the adaptive virtual disks causes more or less chunks to be stored in the physical storage devices. The user grows or shrinks the bandwidth of adaptive virtual disks using the API 325. Growing or shrinking of the bandwidth of the adaptive virtual disk may cause a migration of chunks to faster or slower physical storage devices to satisfy I/O performance requirements. The adaptive virtual disk middleware 340 uses the slowest and least amount of local data storage devices in order to deliver requested data storage capacities and bandwidths for all virtual disks per users' needs and further in order to satisfy QoS requirements specified by SLA (Service Legal Agreement). Dynamic striping (i.e. distribution of chunks on different physical devices in order to increase the throughput of parallel accesses) and consolidation of chunks (i.e. gathering of chunks on a single physical device) are used to achieve the optimization described above.

As shown in FIG. 6, the cloud computing storage system further includes: a monitoring/prediction engine 330. The monitoring/prediction engine 330 monitors I/O parameters (e.g., number of IOPS (Input and Output Operation Per Second), size of data being transferred, disk bandwidth, data storage capacity needed for I/O operations per a user, etc.). The monitoring/prediction engine 330 predicts, based on stored historical information associated with I/O operation (e.g., reading and/or writing of data from or into the block device 215), an I/O operation to be occurred in a future pre-determined time period (e.g., I/O operations to be occurred in a following day, etc.). The prediction is constantly fed to the allocation/reorganization engine 335 in order to influence a decision of how to allocate new chunks and migrate already existing chunks.

The cloud computing storage system 200 may utilize virtualization techniques in order to leverage a physical infrastructure (e.g., a compute node 205, etc.) running the adaptive virtual disks. Such virtualization techniques are implemented by a hypervisor, i.e., the software responsible to emulate virtual machines and devices on top of the physical infrastructure.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
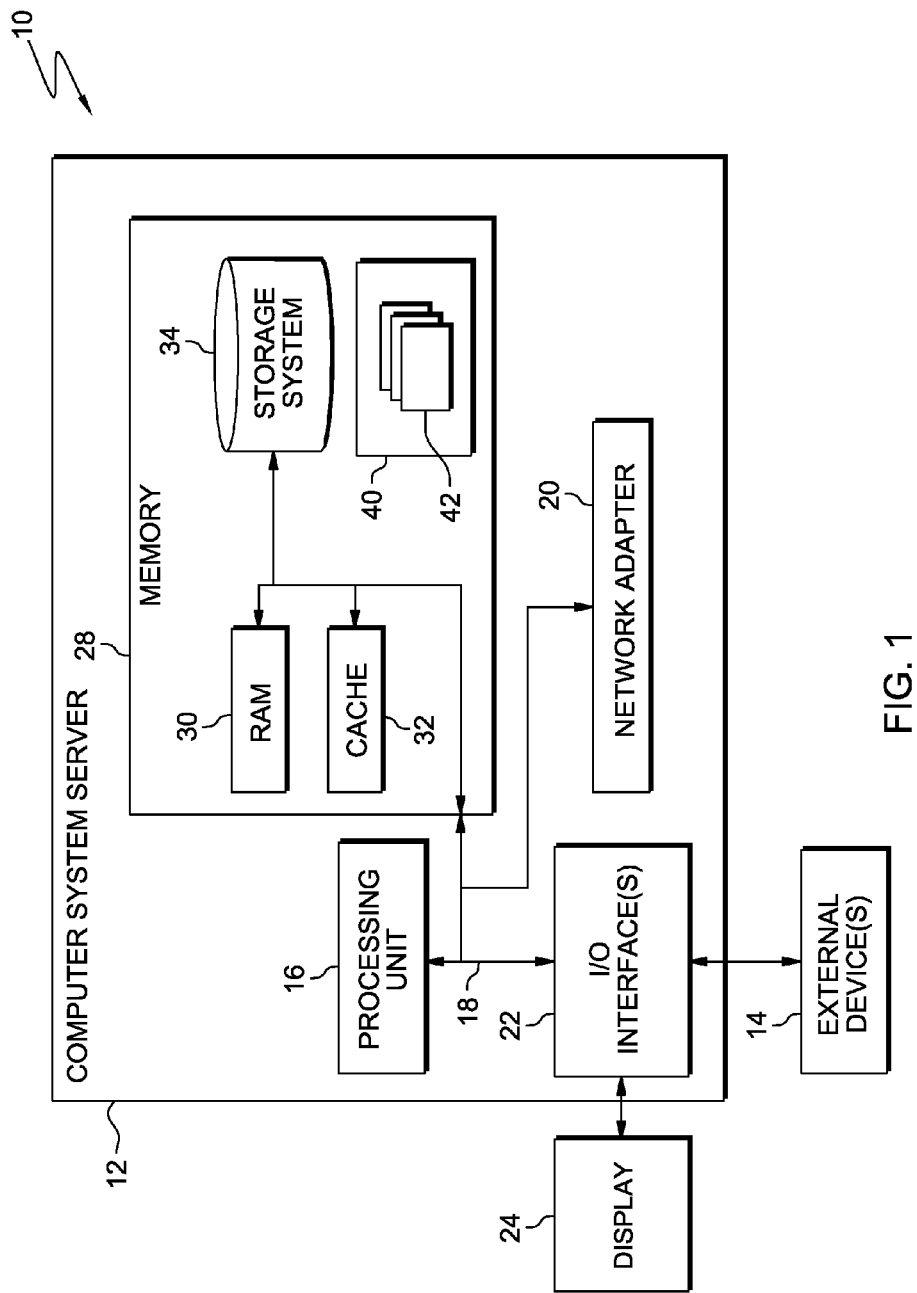
FIG. 1 depicts a cloud computing node according to one embodiment.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
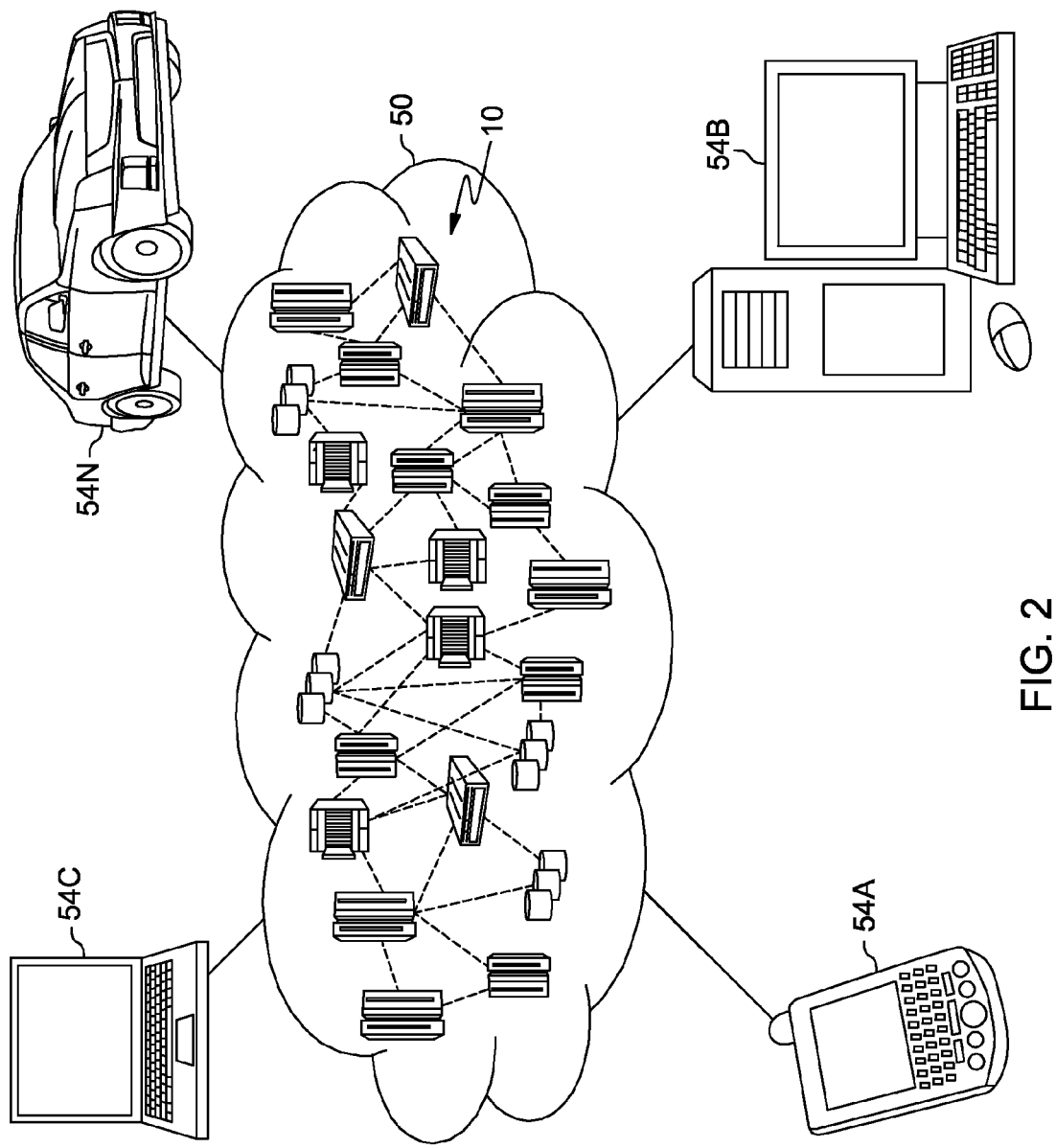
FIG. 2 depicts a cloud computing environment according to one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
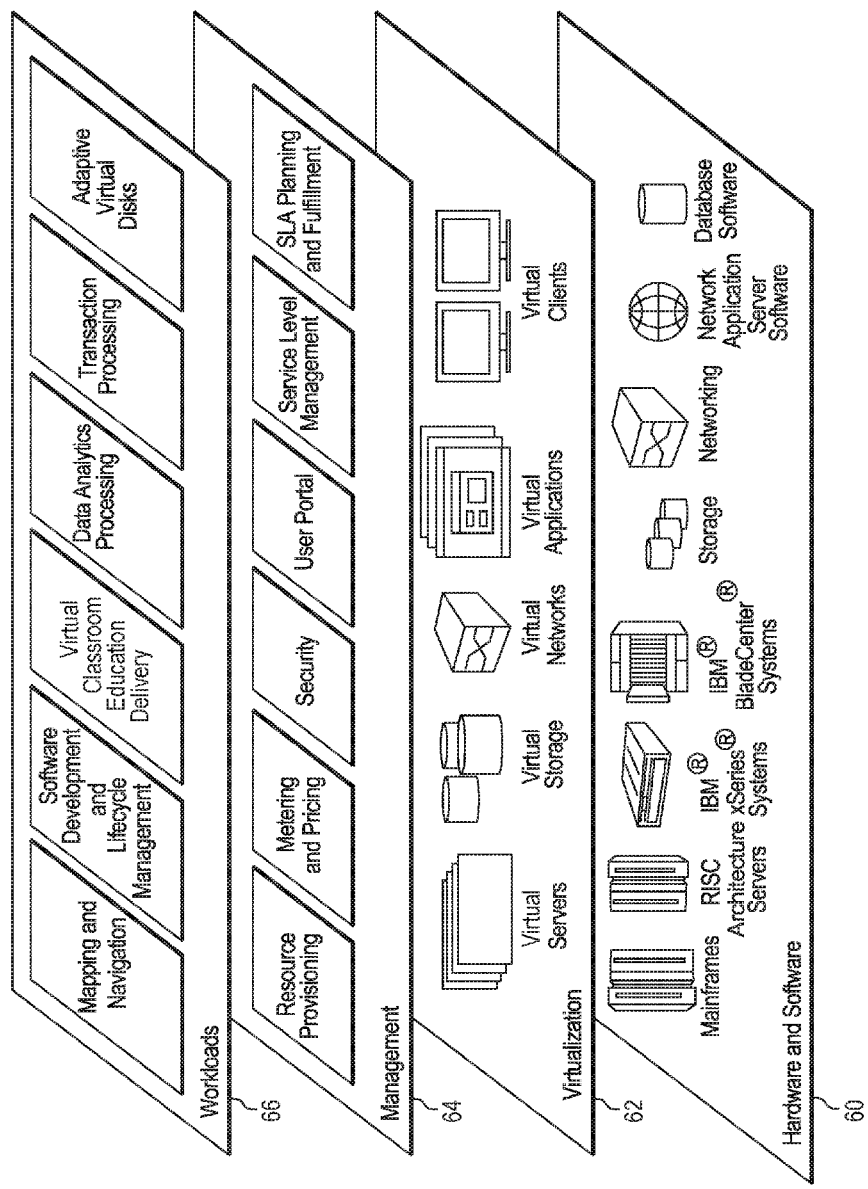
FIG. 3 depicts abstraction model layers according to one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual disks; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and adaptive virtual disks.

In one embodiment, the methods shown in FIG. 4 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the method shown in FIG. 4 may be implemented on a semiconductor chip, e.g., ASIC (Application-Specific Integrated Circuit), by using a semi custom design methodology, i.e., designing a semiconductor chip using standard cells and a hardware description language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method for operating a cloud computing storage system, the method comprising:
    allocating and managing at least one virtual disk for a user, the at least one virtual disk providing a logical data storage;
    dividing data stored in the at least one virtual disk into chunks and allocating the chunks to physical data storage devices;
    monitoring Input/Output (I/O) access patterns corresponding to the user and requests provided from the user, wherein the requests provided from the user includes change of data storage capacity and throughput of the at least one virtual disk in real time;
    dynamically reconfiguring an allocation of the chunks to the physical data storage devices in response to the monitored I/O access patterns and the requests provided from the user, and
    charging, by using a cost model, the user based on the data storage capacity and the throughput of the at least one virtual disk, the cost model determining a cost to use the cloud computing storage system for the user based on:
        the data storage capacity of the at least one virtual disk that is provided to or to be provided to the user;
        the throughput of the at least one virtual disk that is provided to or to be provided to the user; and
        an adjustment factor that converts the data storage capacity and the throughput of the at least one virtual disk, which is provided to or to be provided to the user, to a monetary value.

2. The method according to claim 1, further comprising: enabling the user to modify the data storage capacity and the throughput of the at least one virtual disk dynamically in real time.

3. The method according to claim 1, wherein the reconfiguring the allocation of the chunks comprises:
    migrating the chunks between the physical data storage devices of various capacities and throughput capabilities in order to dynamically adapt to a modification of I/O performance and capacity requirements as specified by the user.

4. The method according to claim 3, wherein the reconfiguring the allocation of the chunks comprises:
    consolidating the chunks in the physical data storage devices providing a least throughput and capacity in order to support as many users as possible and reduce operational costs without violating the I/O performance and the capacity requirements.

5. The method according to claim 4, wherein the migration and consolidation relies on:
    monitoring I/O parameters that include one or more of: number of I/O operations, size of data being transferred, data storage capacity needed for the I/O operations; and
    predicting, based on the monitored I/O parameters and past I/O operations, I/O operations to be occurred in a future pre-determined time period.

6. The method according to claim 1, wherein the allocation and
    management of the at least one virtual disk comprises:
    virtualization techniques to leverage a physical infrastructure running the at least one virtual disk.

7. A system for operating a cloud computing storage system, the system comprising:
    a middleware running on a cloud computing infrastructure, said middleware configured to perform:
    allocating and managing at least one virtual disk for a user, the at least one virtual disk providing a logical data storage;
    dividing data stored in the at least one virtual disk into chunks and allocating the chunks to physical data storage devices;
    monitoring Input/Output (I/O) access patterns corresponding to the user and requests provided from the user, wherein the requests provided from the user includes change of data storage capacity and throughput of the at least one virtual disk in real time;
    dynamically reconfiguring an allocation of the chunks to the physical data storage devices in response to the monitored I/O access patterns and the requests provided from the user, and
    charging, by using a cost model, the user based on the data storage capacity and the throughput of the at least one virtual disk, the cost model determining a cost to use the cloud computing storage system for the user based on:
        the data storage capacity of the at least one virtual disk that is provided to or to be provided to the user;
        the throughput of the at least one virtual disk that is provided to or to be provided to the user; and
        an adjustment factor that converts the data storage capacity and the throughput of the at least one virtual disk, which is provided to or to be provided to the user, to a monetary value.

8. The system according to claim 7, wherein the middleware is further configured to perform:
    enabling the user to modify the data storage capacity and the throughput of the at least one virtual disk dynamically in real time.

9. The system according to claim 7, wherein reconfiguring the allocation of the chunks comprises migrating the chunks between the physical data storage devices of various capacity and throughput capabilities in order to dynamically adapt to the modification of I/O performance and capacity requirements as specified by the user.

10. The system according to claim 9, wherein the reconfiguring the allocation of the chunks comprises consolidating the chunks in the physical data storage devices providing a least throughput and capacity in order to support as many users as possible and reduce operational costs without violating the I/O performance and the capacity requirements.

11. The system according to claim 10, wherein the migration and consolidation relies on:
monitoring I/O parameters that include one or more of: number of I/O operations, size of data being transferred, data storage capacity needed for the I/O operations; and
predicting, based on the monitored I/O parameters and past I/O operations, I/O operations to be occurred in a future pre-determined time period.

12. The system according to claim 7, wherein the allocation and
management of the at least one virtual disk comprises:
utilizing virtualization techniques to leverage a physical infrastructure running the at least one virtual disk.

13. A middleware program product comprising a computer readable storage medium, the computer readable storage medium excluding a propagating signal, the computer readable storage medium readable by a processing circuit and storing instructions run by the processing circuit for performing a method, said method comprising:
allocating and managing at least one virtual disk for a user, the at least one virtual disk providing a logical data storage;
dividing data stored in the at least one virtual disk into chunks and allocating the chunks to physical data storage devices;
monitoring Input/Output (I/O) access patterns corresponding to the user and requests provided from the user, wherein the requests provided from the user includes change of data storage capacity and throughput of the at least one virtual disk in real time;
dynamically reconfiguring an allocation of the chunks to the physical data storage devices in response to the monitored I/O access patterns and the requests provided from the user, and
charging, by using a cost model, the user based on the data storage capacity and the throughput of the at least one virtual disk, the cost model determining a cost to use the cloud computing storage system for the user based on:
the data storage capacity of the at least one virtual disk that is provided to or to be provided to the user;
the throughput of the at least one virtual disk that is provided to or to be provided to the user; and
an adjustment factor that converts the data storage capacity and the throughput of the at least one virtual disk, which is provided to or to be provided to the user, to a monetary value.

14. The middleware program product according to claim 13, wherein the method further comprises:
enabling the user to modify the data storage capacity and the throughput of the at least one virtual disk dynamically in real time.

15. The middleware program product according to claim 14, wherein the reconfiguring the allocation of the chunks comprises:
migrating the chunks between the physical data storage devices of various capacity and throughput capabilities in order to dynamically adapt to the modification of I/O performance and capacity requirements as specified by the user.

16. The middleware program product according to claim 15, wherein the reconfiguring the allocation of the chunks comprises:
consolidating the chunks in the physical data storage devices providing a least throughput and capacity in order to support as many users as possible and reduce operational costs without violating the I/O performance and the capacity requirements.

17. The middleware program product according to claim 16, wherein the migration and consolidation relies on:
monitoring I/O parameters that include one or more of: number of I/O operations, size of data being transferred, data storage capacity needed for the I/O operations; and
predicting, based on the monitored I/O parameters and past I/O operations, I/O operations to be occurred in a future pre-determined time period.

* * * * *